No. 610,077. Patented Aug. 30, 1898.
W. H. McCURDY.
SHIP'S LOG AND REGISTERING MECHANISM.
(Application filed Jan. 23, 1897.)
(No Model.)
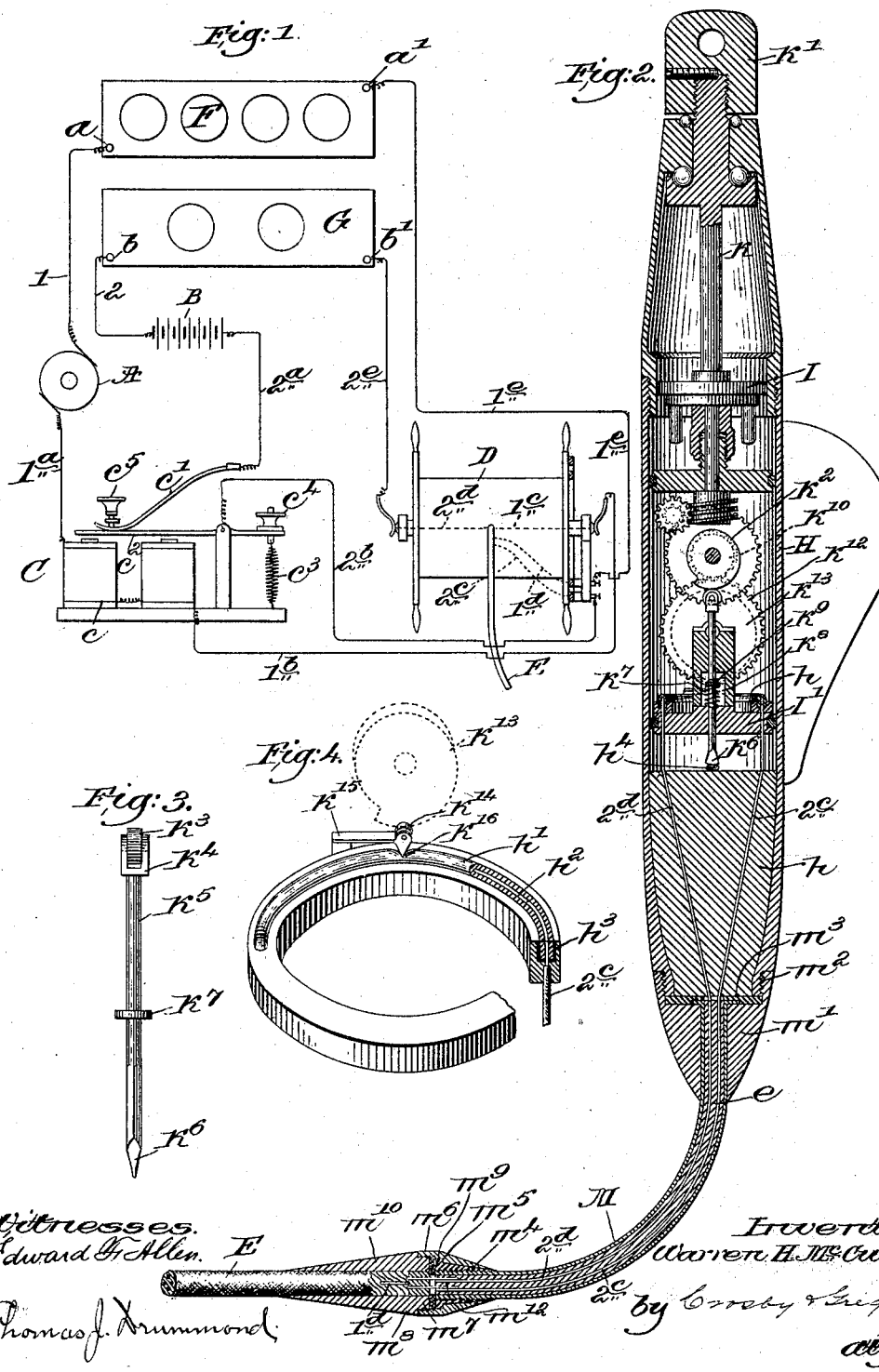
Witnesses.
Edward F. Allen
Thomas J. Drummond
Inventor:
Warren H. McCurdy
by Crosby & Gregory
atty's.

UNITED STATES PATENT OFFICE.

WARREN H. McCURDY, OF BOSTON, MASSACHUSETTS.

SHIP'S LOG AND REGISTERING MECHANISM.

SPECIFICATION forming part of Letters Patent No. 610,077, dated August 30, 1898.

Application filed January 23, 1897. Serial No. 620,441. (No model.)

*To all whom it may concern:*

Be it known that I, WARREN H. MCCURDY, of Boston, county of Suffolk, State of Massachusetts, have invented an Improvement in Ships' Logs and Registering Mechanisms, of which the following description, in connection with the accompanying drawings, is a specification, like letters on the drawings representing like parts.

My present invention relates to improvements in apparatus of the kind set forth in my application, Serial No. 578,641.

One serious objection to an electric log is that no record is made thereby when the dynamo or other source of electricity stops, and inasmuch as the dynamo is liable to be stopped temporarily at any time or the batteries are liable to run out without its being noticed, it may be at night, the reliability of the log is greatly impaired.

I provide, therefore, two independent sources of electric energy, one of which is normally inactive, and connect these by an automatic switch, so that in case the dynamo should break down or need repairing no mileage would be lost, the log being automatically cut out of circuit with the dynamo and put in circuit with a battery or other source of electric current, and upon again starting the dynamo the log would be automatically shifted at once out of circuit with the battery and into circuit with the dynamo.

A further provision relates to registering speed for special purposes—as, for instance, when entering a harbor, nearing land, &c. Ordinarily it is sufficient to register miles or even tens of miles; but under certain circumstances—such as I have indicated, for example—it is desirable to be much more definite and to register shorter distances, as tenths of miles.

Accordingly my invention comprehends means for shifting the log into one or another circuit to accomplish this purpose, thereby getting the speed in one denomination normally and in another denomination when desired, the power or current in either case being cut off and saved from the moment that the other circuit is brought into registering action.

I have also made provision for readily removing my improved log from its cable—for repairs, for instance—without disturbing the latter or its connected mechanism. Improvements are also made in the internal mechanism of the log, including means rendering of little damage the accidental entrance of water into the log, said entrance having been heretofore disastrous in preventing proper electrical action.

The various details of my invention will be more definitely understood in the course of the following description, reference being had to the accompanying drawings, illustrative thereof.

In the drawings, Figure 1 is a diagrammatic view including an automatic switch, showing the circuit connections of my improved registering system. Fig. 2 is a central longitudinal section of my improved log and a portion of its cable. Fig. 3 is a detail sectional elevation of a contact-plunger. Fig. 4 is a perspective view, parts being broken away, showing one of the circuit-interrupting mechanisms.

For the purposes of illustration in describing my invention it will be supposed that the vessel is provided with a dynamo A and with a complement of batteries B, although any other sources of electric energy may be substituted.

Four terminals or binding-posts $a$ $a'$ $b$ $b'$ are respectively in circuit with the dynamo A and battery B, a wire 1 connecting from post $a$ to the dynamo, a wire $1^a$ connecting thence to an electromagnet $c$ of an automatic switch C, the circuit proceeding thence by a wire $1^b$ to a reel D, containing an out-wire $1^c$ and a return-wire $1^d$ in the cable E and reaching the post $a'$ by a wire $1^e$.

The wiring of the battery-circuit is illustrated by wires 2 from post $b$ to battery B, $2^a$ to a spring contact-arm $c'$, $2^b$ from an armature $c^2$ of the switch C, $2^c$ $2^d$ of the log's cable E, and $2^e$ between the reel and post $b'$.

I do not limit myself to this system of wiring, as any arrangement may be employed comprising two circuits and any means to switch from one to the other.

In the switch herein shown the armature $c^2$ is held by a spring $c^3$ under a tendency to move out of contact with the electromagnets $c$ and into contact with an arm $c'$, adjusting-screws $c^4$ $c^5$ being provided for a purpose presently to be described.

As the dynamo A is started its current energizes the electromagnets $c$, thereby pulling over the armature $c^2$ against the tension of its spring $c^3$, breaking the battery-circuit and establishing the dynamo-circuit. The result is that the battery is saved from exhaustion and the registering mechanism is operated by the circuit including the terminals $a$ $a'$, the other and inactive battery-circuit remaining ready, however, instantly to resume its work the moment that for any reason a current ceases to energize the electromagnets, the spring $c^3$ at such moment shifting the armature $c^2$ into contact with arm $c'$ to make the battery-circuit. The two circuits may, if desired, be employed to operate one and the same registering device; but I prefer to have the circuit, including the usually operating-current of the vessel, (supposed in the present instance to be a dynamo-circuit,) connected to operate a register F, indicating, for instance, nautical miles or other considerable distance, and to have the other circuit connected to operate a register G, indicating, for instance, tenths of a mile or other short distance. By means of this provision I am enabled to take the speed accurately in tenths of miles when passing through fogs in dangerous localities, nearing a shore, entering a harbor, &c., and yet not be obliged to register more than miles on the general run of the course day by day.

In some instances, however, it may be desirable to throw both registers into operation for a time, and therefore I provide any suitable means therefor, as the set-screw $c^5$, by means of which the arm $c'$ may be clamped down against the armature $c^2$ to complete the battery-circuit at the same time that the dynamo-circuit is active.

Referring now to Fig. 2, which shows my improved log in longitudinal section, H designates a shell containing water-tight packed heads I I', make-and-break mechanism, shaft $k$, its end piece $k'$ for connection to the rotator, (not shown,) and a plug $h$.

As specified in my before-mentioned application, it is essential that sea-water shall not get inside of the log and into contact with the electric terminals, because if it does the circuit is thereby completed through the water and all accuracy of registering is destroyed. It is practically impossible, however, to absolutely keep out all moisture, notwithstanding the close joints of the shell and the packed heads of my log, and therefore I have inclosed the wire-terminals in the ends of a strong rubber tube $h'$, (see Fig. 4,) the intermediate portion of the latter being filled with mercury $h^2$, and have embedded or sealed the inturned ends of the tube in a cavity filled with cement $h^3$.

A blunt plunger is brought to bear intermittingly on the middle portion of the tube, thereby compressing the walls thereof and breaking the column of mercury and electric current as desired without any interference of surrounding water that may seep into the log.

A cam $k^2$, driven by worm-and-pinion connection from the shaft $k$, bears on a roll $k^3$, carried in the bifurcated end $k^4$ of a plunger $k^5$, (see Fig. 3,) which operates through the head I' and carries a blunt point $k^6$ to compress the terminal tube $h^4$ of the dynamo-circuit, a spring $k^7$ in a pocket $k^8$ bearing against a shoulder $k^9$ on the plunger to hold the latter in engagement with its cam.

A small pinion $k^{10}$ is indicated by dotted lines, turning with the cam $k^2$ to drive a larger gear $k^{12}$ and cam $k^{13}$, the latter bearing on a roll $k^{14}$ (see Fig. 4) of a spring $k^{15}$, overhanging the terminal tube $h'$, said spring having a blunt lip $k^{16}$ to compress the tube and thereby break the electric current of the battery-circuit.

Any other operating mechanism may be employed, I having shown my present improvements as applied in connection with the log of my aforesaid application for convenience merely.

It is evident that the cam $k^2$, supposed to rotate once every tenth of a mile, and the cam $k^{13}$, supposed to rotate once every mile, will make and break their respective columns of mercury at every rotation, but the effective one only will be registered for the reason that the automatic switch C maintains one circuit broken or cut out, as before explained.

It is necessary that the union between the log and its cable should be exceedingly strong and durable, permitting limited flexure and offering a minimum hindrance in dragging through the water, and it is at the same time desirable that the log may be capable of quick removal for repairs and inspection. Accordingly I incase a short section $e$ of the cable in a thin sheath M, of brass, copper, or other suitable material, provided with a flange $m$ at one end, by which it is held by a cap $m'$, screwed onto the end of the log at $m^2$, a washer or packing $m^3$ being interposed.

On the opposite end of the sheath M is soldered or screwed a tapered annulus $m^4$, having an end shoulder $m^5$, against which a tapered screw-nut $m^6$ abuts tightly to engage the threaded end $m^7$ of a socket end $m^8$, a packing-ring $m^9$ being compressed between the latter and the annulus $m^4$. The socket end is preferably projected, as shown, to receive the projecting end of tube M and is gradually tapered, as shown at $m^{10}$, along the cable E, so as to offer the slightest resistance in passing through the water.

The four conducting-wires protrude from the main cable and enter sockets in the end of the section M, being pressed into intimate contact with the adjacent ends of the sections of conducting-wires carried thereby, the end of the tube-section being preferably filled with cement $m^{12}$, provided with said sockets.

When, therefore, it is required to remove the log, all that is necessary is to reel in the cable, unscrew the nut $m^6$, and pull the cable apart at its joint. Another log may then be quickly substituted or the old one may at once be conveniently repaired and quickly replaced.

Various changes and substitutions in details of construction and arrangement may be resorted to without departing from the spirit and scope of my invention.

Having described my invention, what I claim as new, and desire to secure by Letters Patent, is—

1. The combination in a ship's-log-registering system, of a log, means contained in and connected with said log to register the ship's speed in denominations of a predetermined character, mechanism also contained in and connected with said log to register on shipboard the ship's speed in denominations indicating shorter distances than said other denominations, said means for indicating said longer distances being normally operative, and said mechanism for indicating said shorter distances being normally inoperative, and means on shipboard to render said latter mechanism operative at will, whereby the one log operates in the system ordinarily to register the ship's speed in denominations indicating relatively long distances and also, when required, and without removal from the water or manipulation, the said log is caused to make its registrations in shorter distances, or more frequently for a given speed, substantially as described.

2. In a ship's-log-registering system, a log, electric circuits, two independent registers, one being normally active and one normally inactive, and means to put one or both of said registers in circuit with said log as desired, substantially as described.

3. In a ship's-log-registering system, a log, two registering mechanisms, electrical connections therefor, a main source of energy, as the ship's dynamo normally in circuit, an auxiliary source of energy normally out of circuit, but always active and means to automatically put said auxiliary source of energy in circuit when said main source breaks down or ceases to supply a given current, substantially as described.

4. A ship's log, provided with four electric wires making two independent circuits, the ends of said wires being sealed in the ends of rubber tubes and intermediately connected by mercury within the tubes, substantially as described.

5. In an electric ship's log, means to prevent the entrance of water therein, and additional means to prevent the access of moisture to the terminal wires, said means including a rubber tube connecting the said terminals, sealed thereabout at its ends, and filled with a liquid conductor, substantially as described.

6. In a ship's log, two independent electric circuits, and two make-and-break mechanisms, one for each circuit, one of said mechanisms being operated faster than the other, substantially as and for the purpose set forth.

7. In an electric ship's log, a make-and-break mechanism, comprising a plunger, a spring-retractor, a friction-roll carried on said plunger, and an actuating-cam, said roll engaging said cam and said retractor maintaining said engagement substantially as described.

8. In an electric ship's log, a make-and-break mechanism, comprising a plunger, a bearing therefor, a roll journaled in one end of said plunger, a cam engaging said roll, and means to actuate the same, substantially as described.

9. The combination with a ship's log, and its cable, of a section M, extending beyond the log and capable of limited flexure said section having a shouldered annulus secured on its outer end, and a screw-nut abutting against said shoulder, and the adjacent end of the cable having a long tapered socket end to offer least resistance in the water threaded to engage said screw-nut opposite said annulus, substantially as described.

10. The combination with a ship's log, and its cable, of an intermediate section, comprising a flexible sheath, a cap at one end to fasten the same to the log, and a joint connection at the other end to join the section to said cable, said connection comprising a tapered and threaded socket end, a shouldered annulus, and a screw-nut, substantially as described.

11. In combination with an electric ship's log, a tubular section containing conducting-wires for connection to the log, and a cable also provided with conducting-wires, the latter wires projecting from and beyond their cable, and the adjacent end of said section being provided with sockets containing and in which are exposed the ends of its wires said sockets receiving the said projecting wires of the cable when the latter is coupled to said section, substantially as described.

In testimony whereof I have signed my name to this specification in the presence of two subscribing witnesses.

WARREN H. McCURDY.

Witnesses:
 GEO. W. GREGORY,
 GEO. H. MAXWELL.